United States Patent Office 3,375,213
Patented Mar. 26, 1968

3,375,213
MODIFICATION OF STEREOREGULAR POLYOLEFINS WITH SYNERGISTIC POLYMERIC COMBINATIONS
Jack J. Press, 12–18 E. Laurelton Parkway, Teaneck, N.J. 07666
No Drawing. Continuation-in-part of application Ser. No. 113,972, Apr. 4, 1961. This application Oct. 27, 1964, Ser. No. 406,939
5 Claims. (Cl. 260—17)

ABSTRACT OF THE DISCLOSURE

Stereoregular polypropylene, polymethylpentene, and polymethylbuteene have qualities desirable for processing into fibers, yarn, and cloth. Dyeability of these materials is improved by dispersing therethrough a combination of modifier materials consisting of 50 to 95% by weight of a hydrophilic polymer nonsoluble in the stereoregular material and the remainder of a lower molecular weight organic substance having at least one organic group of 6 to 30 carbon atoms; the combination of modifier materials consisting of 2 to 20 percent by weight of the composition consisting of the stereoregular material and the modifier materials. The modifier materils complement each other synergistically.

---

The invention described herein may be manufactured and used by or for the Government of the United States of America for governmental purposes without the payment of any royalties thereon or therefor.

This application is a continuation-in-part of my copending application Ser. No. 113,972, filed Apr. 4, 1961, now abandoned.

This invention relates to stereoregular polyolefins. More particularly, this invention relates to polymeric compositions having improved affinity for dyes, said compositions containing a major amount of stereoregular polyolefins.

It is known that polyethylene is vastly unsuitable for the production of textile fibers due to the relatively poor properties imparted to the product. For one thing, a staple polyethylene fiber will not hold a crimp and this is necessary for textile processing. For another, it is useless to make a textured or stretch yarn from a continuous polyethylene filament because the characteristics imparted to the yarn are not maintained during weaving, dyeing, or ordinary use. Further, the material from which a fabric is made must be thermally stable before it may be subjected to ordinary use. It must not have a relatively low melting point, and the final fabric must not have a high degree of heat sensitivity, nor relatively soft mechanical properties at elevated temperatures. However, the thermal properties of a polyethylene fabric are such that it is impossible to subject it to ordinary ironing without physically damaging the fabric and it has been found to shrink in the conventional dryer. As is apparent from the foregoing, polyethylene cannot be utilized in the manufacture of everyday fabrics for ordinary use.

In recent times, it has been found that certain linear crystalline hydrocarbon polymers containing stereoregular macromolecules and having melting points between 150° and 300° C. can be used for the production of textile fibers without the inherent difficulties encountered with the use of polyethylene polymers for this purpose. Aside from melting point differences, polypropylene with a tertiary carbon and a methyl side chain, crystallizes differently and has a much higher resilience and elasticity. These properties are essential in a generally useful textile fiber. For example, polymers of olefinic hydrocarbons containing stereoregular macromolecules, such as polypropylene, polymethylpentene, and polymethylbutene, offer considerable advantages in the production of fibers, particularly because of their good mechanical properties and lightweight. However, such polymers have not been satisfactory because of their poor affinity for dyes, this poor affinity being due to the particular chemical nature of such polyolefinic hydrocarbons.

Many processes have been proposed in order to improve the affinity of such polyolefinic hydrocarbons for dyes, such as the addition of soluble solid substances to the molten polyolefin before spinning. The addition of basic substances facilitates dyeing with acid dyes, whereas the addition of acid substances favors dyeing with basic dyes, However, such processes have not been completely satisfactory because soluble modifiers interfere with crystallization, impair strength and thermal stability, and are not sufficiently available in the amorpohous regions where dyeing takes place.

It has also been proposed to increase the affinity of dyes for polyolefin fibers by grafting monomers onto the fibers after subjecting the fibers to a preliminary peroxidation or to high energy radiation. When such processes are applied to the polyolefin after it is in filamentary form the surface properties of the grafted fibers are considerably modified and the dye receptivity is improved. However, when such processes are applied to highly crystalline filaments, any grafting onto the preformed fibers takes place only at the surface. Therefore, subsequent dyeing is limited to the surface portion of the fiber and the dye does not penetrate inside the fiber.

In my copending application for Modification of Stereoregular Polyolefins, Ser. No. 400,611, filed Sept. 30, 1964, I show the use of selected hydrophilic polymers to improve the dyeability of stereoregular, high melting, polyolefins. The level of addition ranges from 2 to 20% by weight based on the polyolefin. My hydrophilic, polymeric, modifiers show only limited dyeability with selected small disperse dyes, and only negligible dyeability with larger ionic dyes such as acid, basic, premetallized and direct dyes. The latter dyes are particularly desirable because of their generally better wash, dry clean, and light fastness properties. The depth and range of dyeability can be increased somewhat by increasing either the molecular weight or the level of addition of the primary modifier. However, increasing the molecular weight makes melt dispersion more difficult and increased levels of addition are not economically feasible and adversely effect physical properties, particularly fibrillation.

Surprisingly, I have found that, even at low levels of addition, I obtain synergistic improvements in dyeability by replacing between 5% and 50%, preferably only up to 25%, of the above primary hydrophilic modifiers with selected liquid, wax, or polymeric secondary modifiers having negligible dyeability by themselves. These secondary modifiers are generally low molecular weight additives or posses melting points somewhat lower than the polyolefin itself. These secondary additives associate themselves with the primary hydrophilic polymeric modifier in such a way as to give synergistic combinations that are fusible at temperatures not exceeding the temperature of processing of the polyolefin and have improved processability and dyeability.

It is therefore an object of this invention to provide polymeric compositions containing synergistic combinations, said compositions having improved affinity for dyes devoid of difficulties of the prior art.

Included in this invention are stereoregular polyolefin structures with increased affinity for dyes comprising a matrix of a stereoregular polyolefin taken from the group consisting of (a) polypropylene,
(b) polymethylpentene, and
(c) polymethylbutene, said matrix having dispersed therein between 2 and 20% of a synergistic combination consisting of (1) 50 to 95% of a hydrophilic polymer, non-soluble in the polyolefin, taken from the group consisting of
    (a) polyethylene glycol resins,
    (b) carboxymethylcellulose
    (c) sulphonated vinyl hydrocarbon polymers
    (d) polyvinyl methyl oxazolidinone, and
    (e) polyvinyl pyrrolidone, and (2) 5 to 50% of a lower molecular weight organic substance having at least one organic group with 6 to 30 carbons, said substance selected from the group consisting of
    (a) alkyl esters of polyhydroxy compounds
    (b) alkyl esters of polyglycols, M.W. 60 to 4000,
    (c) alkyl ethers of polyglycols, M.W. 60 to 4000,
    (d) alkyl ethers of polyhydroxy compounds,
    (e) alkoxylated amines,
    (f) di(2-ethylhexyl) phosphoric acid,
    (g) stearyl phosphoric acid,
    (h) salts of dodecylbenzene sulfonic acid,
    (i) salts of naphthalene sulfonic acid,
    (j) N-lauryl trimethylene diamine, and
    (k) salts of di(2-ethylhexyl) phosphoric acid, said synergistic combination being fusible at a temperature not exceeding the temperature of processing of the polyolefin (150 to 350° C.) and forming a complex in said polyolefin.

The primary hydrophilic polymeric modifiers, which exhibit synergistic activity, when combined with the secondary polar modifiers hereinafter described are generally soluble in water or oxygenated solvents and include the following:

Polyalkylene oxide resin having a molecular weight between 50,000 and 4,000,000;
Carboxy methyl cellulose;
Salts of carboxy methyl cellulose;
Sulphonated polystyrene;
Salts of sulphonated polystyrene including alkali metal, alkaline earth metal and amine salts;
Sulphonated polyvinyl toluene;
Phosphonated polystyrene;
Salts of phosphonated polystyrene;
Polyvinyl lactams;
Polyvinyl Pyrrolidones;
Polyvinyl oxazolidones;
Polyvinyl oxazolidinones;
Polyvinyl morpholines;
Polyvinyl morpholinones;
Polyvinyl imidazoles; and
Ethylene styrene sulfonate copolymers.

The secondary polar additives which may be used with the primary modifier to give synergistic combinations include the following:

(1) Alkyl esters of polyhydroxy compounds such as:

(a) glycerol monostearate;
(b) glycerol distearate;
(c) glycerol tristearate;
(d) glycerol mono/dilaurate;
(e) sorbitan monostearate; and
(f) sorbitan dilaurate;

(2) Alkyl esters of polyglycols (M.W. 60 to 4000) such as:

(a) ethylene glycol monostearate;
(b) polyethylene glycol 200 monostearate;
(c) polyethylene glycol 200 distearate;
(d) polyethylene glycol 4000 distearate;
(e) propylene glycol monostearate;
(f) polypropylene glycol 600 monostearate;
(g) butylene glycol monostearate;
(h) polybutylene glycol 800 monostearate;
(i) hexylene glycol monooctoate;
(j) hexylene glycol adipate; and
(k) poly(hexylene glycol adipate) M.W. 800 to 5000;

(3) Alkyl ethers of polyglycols (M.W. 60 to 4000) such as:

(a) ethylene glycol monostearyl ether,
(b) ethylene glycol monolauryl ether,
(c) polyethylene glycol 200 monostearyl ether,
(d) polyethylene glycol 200 monolauryl ether,
(e) polyethylene glycol 200 distearyl ether,
(f) polyethylene glycol 200 mono nonylphenol ether,
(g) polyethylene glycol 4000 monostearyl ether,
(h) polyethylene glycol 4000 distearyl ether,
(i) propylene glycol monostearyl ether,
(j) propylene glycol monolauryl ether,
(k) polypropylene glycol 600 monolauryl ether,
(l) butylene glycol monostearyl ether,
(m) hexylene glycol monooctyl ether.

(4) Alkyl ethers of polyhydroxy compounds such as:

(a) glycerol monostearyl ether,
(b) glycerol distearyl ether,
(c) glycerol dilauryl ether,
(d) glycerol dihexyl ether,
(e) sorbitan monostearyl ether, and
(f) sorbitan dioctyl ether.

(5) Alkoxylated amines such as (a) tertiary stearyl amine with 15 moles ethylene oxide,
(b) tertiary stearyl di(hydroxyethyl) amine,
(c) tertiary stearyl di(hydroxy propyl) amine,
(d) tertiary stearyl di(hydroxy butyl) amine,
(e) tertiary lauryl di(hydroxy propyl) amine,
(f) tertiary lauryl amine with 15 moles of ethylene oxide,
(g) tertiary stearyl amine with 15 moles of propylene oxide,
(h) quaternary stearyl di(hydroxy ethyl) methyl ammonium sulfate,
(i) quaternary stearyl di(hydroxy ethyl) methyl ammonium chloride, and
(j) quaternary stearyl methyl ammonium chloride with 15 moles of ethylene oxide;

(6) Alkyl phosphoric acids and salts such as:

(a) di(2-ethylhexyl) phosphoric acid,
(b) sodium salt of di(2-ethylhexyl) phosphoric acid,
(c) potassium salt of di(2-ethylhexyl) phosphoric acid,
(d) isopropyl amine salt of di(2-ethylhexyl) phosphoric acid,
(e) triethanolamine salt of di(2-ethylhexyl) phosphoric acid,
(f) monostearyl phosphoric acid,
(g) potassium salt of monostearyl phosphoric acid,
(h) distearyl phosphoric acid,
(i) sodium salt of distearyl phosphoric acid,
(j) monolauryl phosphoric acid,
(k) lauryl ethyl phosphoric acid, and
(l) dioctyl phosphoric acid;

(7) Miscellaneous compounds such as:

(a) N-lauryl trimethylene amine,
(b) N-stearyl trimethylene diamine,
(c) perfluorononyllic acid,
(d) dihydrogenated tallow methyl amine,
(e) stearic acid,
(f) alkylene (2 to 4 carbon) oxide derivatives of alkyl (6 to 30 carbons) amines, and
(g) polyalkylene glycols having 2 to 4 carbons and 4 to 50 alkylene oxide groups;

(8) Alkyl and aryl sulfonic acids and salts such as:

(a) dodecylbenzene sulfonic acid,
(b) sodium salt of dodecylbenzene sulfonic acid,
(c) potassium salt of dodecylbenzene sulfonic acid, (d) isopropyl amine salt of dodecylbenzene sulfonic acid,
(e) triethanolamine salt of dodecylbenzene sulfonic acid,
(f) lauryl sulfonic acid,
(g) sodium salt of lauryl sulfonic acid,
(h) naphthalene sulfonic acid,
(i) sodium salt of naphthalene sulfonic acid,
(j) potassium salt of naphthalene sulfonic acid, and
(k) formaldehyde condensate of naphthalene sulfonic acid.

The stereoregular polyolefins which may be treated with the synergistic combinations of the present invention include isotactic and syndiotactic polyolefins such as: polypropylene, polymethylpentene, and polymethylbutene.

The following examples set forth typical synergistic combinations of primary and secondary modifiers falling within the concept of this invention. Each is followed by results quite clearly illustrating the synergism encountered when each combination is introduced into the stereoregular polyolefin.

*Example 1*

In accordance with the procedure which follows, I prepared discs using, as modifiers, (EH)—polyethylene glycol resins—M.W. 300,000, (DU)—N-lauryl trimethylene diamine, and (SNA)—sodium naphthalene sulfonate. The EH was dissolved in dioxane, and the other modifier components in isopropanol or isopropanol/water.

I mixed the modifier uniformly with the uninhibited isotactic polypropylene (M.W.—350,000, M.P.—170° C., melt index—3, and isotacticity of 95%) as indicated in the table which follows.

The dried mixture was prepared in the form of a disc in the following manner. It was spread uniformly in a circular shouldered Pyrex glass dish with an inside diameter of 4 inches. The dishes were then covered by an inner nesting circular shouldered Pyrex glass dish with a bottom outer separation rib projecting downwardly about 0.05 inch. The assembly weighted with a preheated 5 pound weight was then placed in an oven at 250° C. for 6 to 15 minutes. Then the weight was removed and the assembly was placed in a refrigerator at about 4° C. to cool. The assembly dishes were then separated to give a fused disc. To improve the uniformity of dispersion, the disc was cut radially into 6 equal sections and refused, using the above procedure.

A portion of each of the above fusion discs after water rinsing was individually placed in a separate dye pot together with 20 times its weight of distilled water and from 0.5 to 2% of the dye on the weight of the sample. The following dyes were utilized in separate baths viz.

AMR—Colour Index, Acid Red 182;
BR—Calcozine Acrylic Red 3G, a quaternized heterocyclic azo dye; and
BO—Colour Index, Basic Orange 21.

The dye baths were each heated over an hour to a temperature of 95% C. and the temperature was maintained for 2 hours. The dyed samples were then rinsed, given a 10 minute 95° C. launder in the dye pot at a 20 to 1 bath to sample ratio with a 5 grams per gallon Tide detergent solution. The samples were then rinsed, dried, and judged for depth and uniformity of shades. The results of these tests are set forth below.

DISCS [1]

|  | 1(a) | 1(b) | 1(c) | 1(d) | 1(e) |
|---|---|---|---|---|---|
| (1) Percent EH | 5 | 4 | 4 |  |  |
| (2) Percent DU |  | 1 |  | 1 |  |
| (3) Percent SNA |  |  | 1 | 1 | 1 |
| (4) Dispersibility in Polyolefin | Good | Excellent | Good | Good | Very good. |
| (5) Dyeability with— |  |  |  |  |  |
| (a) AMR | Light | Medium | Medium | Undyed | Undyed. |
| (b) BR | Very light | Light | do | do | Do. |
| (c) BO | do | do | do | do | Do. |

[1] All percentages by weight.

The synergistic effect of substitution of 20% of a nonionic modifier by ionic additives on the dyeability of portions of the discs is illustrated by the above results using representative acid and basic dyes.

*Example 2*

In this example, tests similar to those of Example 1 were performed except that, in this case, the modifier containing polyolefin was extended into fiber, drawn and then dyed using conventional equipment and processes.

The formulation was melt mixed in a continuous screw extruder, forced through a 60 mil die at 260° C. and collected at ambient temperature on a reel as a 30 denier filament.

The filament was then heat stretched 300% to give a strong, oriented 10 denier fiber. The fiber skeins were then scoured with detergent at 140° F., and dyed at the boil for one hour at a 20/1 bath to fiber ratio.

The fiber, as spun, was judged subjectively for uniformity of dispersion of modifier in the polyolefin and the dyeings were judged for level of dyeability (depth of shade) with the following dyes.

Colour Index
AMR _____ Acid Red 182
AR _____ Acid Red 127

DISCS [1]

|  | 2(a) | 2(b) | 2(c) | 2(d) |
|---|---|---|---|---|
| (1) Percent EH | 5 | 2 | 6 | 14. |
| (2) Percent DU |  | 1 | 1 | 1. |
| (3) Dispersibility | Good | Excellent | Excellent | Good. |
| (4) Dyeability with— |  |  |  |  |
| (a) AMR | Light | Light | Medium | Dark. |
| (b) AR [2] | Undyed | do | do | Do. |

[1] All percentages by weight.
[2] AR=Colour Index, Acid Red 127.

Some of my preferred hydrophilic polymeric primary modifiers cannot be used by themselves because they are unfusible at normal polyolefin processing temperatures or because they have such high melting temperatures and melt viscosities that they are very difficult to disperse in the polyolefin.

Surprisingly, I have found that replacing up to 50% of these infusible or high melting (over 200° C.) primary modifiers with my secondary modifiers, not only makes it practical to disperse the primary modifier in the polyolefin but also gives synergistic improvements in dyeability. This is illustrated by the examples which follows.

*Example 3*

In accordance with the general procedure of Example 1, I prepared discs 3a to 3g using as a primary modifier (a) CMC (sodium carboxymethyl cellulose, 1.3 substitution, medium viscosity—CMC 12 m, Hercules Powder Co.) and 2/1 ratio combinations of CMC with (b) quaternary dihydrogenated tallow methyl amine, (c) tertiary dihydrogenated tallow methyl amine, (d) (e) sodium salt of di(2-ethylhexyl), phosphoric acid, and (f) (g) polyethylene glycol 200 distearate respectively.

The above discs were dyed in accordance with the procedure heretofore described with a DO dye (Colour Index, Dispersed Orange 3) and the results were tabulated below.

DISCS [1]

|  | 3(a) | 3(b) | 3(c) | 3(d) | 3(e) | 3(f) | 3(g) |
|---|---|---|---|---|---|---|---|
| (1) Dispersibility in Polyolefin | Very poor | Fair | Good | Good | Excellent | Good | Excellent. |
| (2) Dyeability with DO dye | Light | Dark | Dark | Dark | Tint | Dark | Tint. |
| (3) Percent CMC | 5 | 3.3 | 3.3 | 3.3 | 3.3 | 3.3 |  |
| (4) Percent Secondary modifier |  | 1.7 | 1.7 | 1.7 | 1.7 | 1.7 | 1.7. |

[1] All percentages by weight.

Disc 3a exhibited poor uniformity of dispersion because of the infusibility of the modifier. Disc 3b to 3d and 3f exhibited fair to good uniformity of dispersion with little increase in opacity except for 3d, which had about 100% increase in opacity.

*Example 4*

In accordance with the general procedure of Example 1, I prepare discs 4(a) to 4(n) using, as modifiers (a) (sodium salt of sulfonated polyvinyltoluene, M.W. 400,000–ET–181, Dow Chemical Co.) and 1.5/1 ratio combinations of (a) with (b) glycerine, (c) methoxy polyethylene glycol resin having M.W. of 350, (d) polyethylene glycol having M.W. of 4,000, (e) glycerol monostearate, (f) polyethylene glycol 200 distearate, (g) DDBSA (dodecyl benzene sulfonic acid), (h) isopropylamine salt of DDBSA, (i) sodium salt of di(2-ethylhexyl) phosphoric acid, (j) triethanolamine salt of mono/distearyl phosphoric acid, (k) dihydrogenated tallow amine, (l) lauryl dimethyl amine, (m) trihydrogenated octadecyl methyl ammonium chloride and (n) dihydrogenated tallow dimethyl ammonium chloride.

The discs were dyed with the dyes hereinbefore described and the results were tabulated below.

*Example 5*

In this example, the fiber was prepared and evaluated in the manner set forth in Example 2. In this case, however, the modifiers utilized were (oxa) which is poly-N-vinyl-5-methyl-2-oxazolidinone, and (200 MS) which is polyethylene glycol 200 monostearate. The results of the evaluation may be seen below:

FIBERS [1]

|  | a | b | c |
|---|---|---|---|
| Percent (oxa) | 5 | 4 |  |
| Percent (200 Ms) |  | 1 | 1. |
| Dispersibility in Polyolefin | Very poor | Good | Good. |
| Dyeability with— |  |  |  |
| AMR | Undyed | Medium | Undyed. |
| AR | Undyed | Light | Do. |
| DO | Light | Dark | Very light. |

[1] All percentages being by weight.

*Example 6*

In accordance with the procedure set forth in Example 1, I prepared discs (a) to (j) using, as modifiers, (a) polyvinyl pyrrolidone—M.W. 360,000, alone, and in a 9/1 ratio with the following secondary modifiers viz. (b) nonylphenol polyglycol ether containing four moles of

|  | a | b | c | d | e | f | g | h | i | j | k | l | m | n |
|---|---|---|---|---|---|---|---|---|---|---|---|---|---|---|
| Percent addition [1] | 5 | 5 | 5 | 5 | 5 | 5 | 5 | 5 | 5 | 5 | 5 | 5 | 5 | 5. |
| (1) Dispersibility in Polyolefin | Very poor | Good | Good | Good | Good | Good | Fair | Good | Good | Good | Very good | Good | Good | Good. |
| (2) Dyeability with— |  |  |  |  |  |  |  |  |  |  |  |  |  |  |
| (a) BR | l | l m | l m | m | m/d | m/d | m | m | m/d | m | m | m | m | m. |
| (b) BO | l | l m | m | m | m/d | m/d | m | m/d | m | m | m | m | m | m. |
| (c) DLV | m | m/d | d | m/d | d | d | d | d | d | d | d | d | d | d. |
| (d) DO | m | m/d | d | m/d | d | d | d | d | d | d | d | d | d | d. |

[1] All percentages being by weight.
d=dark; l=light; l m=light to medium; m=medium; m/d=medium/dark; DLV=Latyl Violet 2R disperse dye.

The foregoing list of chemicals, which were utilized to prepare discs 4(b) to 4 (n), are examples of lower melting nonionic, anionic, and cationic compounds which may be used as secondary additives to make an infusible or high melting primary modifier such as sulphonated vinyl hydrocarbon polymers, dispersible in stereoregular polyolefins. Due to its high molecular weight (400,000) of the primary modifier, the portions of the prepared discs when dyed with basic dyes, such as BR and BO, and dispersed dyes such as DLV and DO, gave mostly medium to dark shades with good fasteners to washing. Portions of the prepared disc made with the anionic and the cationic secondary additives (4h to 4n), all showed resistivities of from 0.03 to 0.5×10^10 ohms per square cm. after four hot launderings in a domestic washing machine. Results, similar to the above, were obtained when either the ammonium salt or sulfonated polyvinyltoluene or the sodium salt of sulfonated polystyrene was utilized as primary modifier in the combination.

ethylene oxide, (c) polyethylene glycol 200 distearate, (d) glycol monostearate, (e) tertiary dihydrogenated tallow methyl amine, (f) tertiary hydrogenated tallow dimethyl amine, (g) tertiary lauryl dimethyl amine, (h) tertiary lauryl di(hydroxypropyl) amine, (i) tertiary lauryl amine with 15 moles of propylene oxides, and (j) quaternary tallow di(hydroxypropyl) methyl ammonium sulfate, respectively.

The discs were then dyed and evaluated in the same manner as set forth in Example 1.

DISCS [1]

|  | a | b | c | d | e | f | g | h | i | j |
|---|---|---|---|---|---|---|---|---|---|---|
| Percent primary modifier | 5 | 4.5 | 4.5 | 4.5 | 4.5 | 4.5 | 4.5 | 4.5 | 4.5 | 4.5 |
| Percent secondary modifier |  | 0.5 | 0.5 | 0.5 | 0.5 | 0.5 | 0.5 | 0.5 | 0.5 | 0.5 |
| Dispersibility in Polyolefin | Poor | Good | Good | Good | Fair | Good | Good | Good | Good | Good. |
| Dyeability with — |  |  |  |  |  |  |  |  |  |  |
| AMR | l | l/m | l/m | l/m | m | m | m | d | d | d. |
| DLV | l | m | d | d | d | m | d | d | d | d. |

[1] All percentages being by weight.
d=dark; l=light; l/m=light/medium; m=medium.

*Example 7*

In accordance with the general procedure of Example 1, I prepared discs (a) to (f) using, as a primary modifier, polyvinylpyrrolidone (M.W. 360,000) alone and in a 4/1 ratio combination with the following secondary modifiers viz. (a) quaternary hydrogenated tallow trimethyl ammonium chloride; (b) N-tallow, N-N-dimethyl, N',N',N'-trimethyl-1,3-propylene diammonium chloride; (c) quaternary stearyl di(hydroxyethyl) methyl ammonium chloride, (d) quaternary stearyl methyl ammonium chloride containing 15 moles of ethylene oxide, (e) tertiary stearyl di(hydroxyethyl) amine, and (f) tertiary stearyl amine with 15 moles of ethylene oxide, respectively.

The discs were then dyed and evaluated in the manner set forth in Example 1.

|  | Blank | a | b | c | d | e | f |
|---|---|---|---|---|---|---|---|
| Percent primary modifier [1] | 5 | 4 | 4 | 4 | 4 | 4 | 4. |
| Percent secondary modifier [1] | | 1 | 1 | 1 | 1 | 1 | 1. |
| Dispersibility in Polyolefin | Very poor | Fair | Good | Fair | Good | Fair | Very good. |
| Dyeability with AMR dye | Light | Light/medium | Medium | Medium | Dark | Medium | Dark. |

[1] All percentages being by weight.

Example 8

In accordance with the procedure of Example 1, I prepared discs (a) to (e) containing either (PVP), which is polyvinylpyrrolidone (M.W. 360,000), alone or in combination with various percentages of (SM) which is tertiary stearylamine with 15 moles of ethylene oxide.

The discs were dyed and evaluated as follows:

|  | a | b | c | d | e |
|---|---|---|---|---|---|
| Percent PVP [1] | 5 | 2 | 4 | 8 | |
| Percent SM [1] | | 1 | 1 | 2 | 1. |
| Dispersibility in Polyolefin | Very poor | Good | Good | Good | Fair. |
| Dyeability with— | | | | | |
| AMR dye | Very light | Light/medium | Medium | Dark | Undyed. |
| AR dye | Light | Medium/dark | Dark | do | Do. |

[1] All percentages being by weight.

Example 9

In accordance with the general procedure of Example 1, I prepared discs (a) to (g) using, as a primary modifier, polyvinylpyrrolidone (M.W. 360,000) alone (a) and in combination with the following secondary modifiers viz.

(b) 8/2 ratio with di(2-ethylhexyl) phosphoric acid,
(c) 8/2 ratio with dodecyl benzene sulfonic acid,
(d) 8/2 ratio with stearic acid,
(e) 5/5 ratio with di(2-ethylhexyl)phosphoric acid,
(f) 5/5 ratio with dodecyl benzene sulfonic acid, and
(g) 6/3 ratio with sodium di(2-ethylhexyl) phosphate, respectively.

The discs were dyed and evaluated in the manner set forth in Example 1 and the results were set forth below.

|  | a | b | c | d | e | f | g |
|---|---|---|---|---|---|---|---|
| Percent primary modifier [1] | 5 | 4 | 4 | 4 | 2.5 | 2.5 | 3.3. |
| Percent secondary modifier [1] | | 1 | 1 | 1 | 2.5 | 2.5 | 1.7. |
| Dispersibility in Polyolefin | Poor | Good | Good | Fair/good | Good/excellent | Good | Good. |
| Dyeability with AMR dye | Light | Medium | Light/medium | Medium | Light/medium | Light/medium | Light/medium. |

[1] All percentages being by weight.

|  | Resistivity (×10¹⁰ ohms per sq.) | |
|---|---|---|
|  | Initial | RTRL |
| a | 800 | 150 |
| b | 50 | 40 |
| c | 0.3 | 1 |
| d | 200 | 100 |
| e | 60 | 20 |
| f | 0.3 | 0.4 |
| g | 0.3 | 5 |

The static propensity (resistivity) initially and after a Room Temperature Rinse-Laundry, designated as RTRL, (5 minute water rinse, 10 minute stirring with 20 times disc weight of 5 grams/1 gallon Tide detergent, and water rinse) of the discs are given below:

Many alternate methods of combining my modifiers with polyolefins are readily available. They may be combined during formation of the polymeric modifier or during actual polymerization of the polyolefin, with or without meeting. They may be added to freshly polymerized polyolefin, which is still in solution in a suitable solvent, in the powdered form, or as a solution in a compatible solvent, or merely as a dispersion. They may be added to polyolefin during precipitation, washing, neutralizing or compounding of the freshly prepared polyolefin prior to drying. This may be accomplished by adding the modifier as a powder or as a solution which is a non-solvent for the polyolefin.

The modifiers may also be melt mixed during processing or blending of the polymer prior to use in extrusion fiber, film, coating or plastic. It may also be added as a liquid or powder to finely ground or micronized polyolefin polymers and then melt dispersed in situ during hot dip or spray coating or during spreading and heat coating opeartion. They may be incorporated in polyolefin solutions or emulsions and then applied to surfaces with or without heating.

In my copending application, I show the use of selected hydrophilic polymers to improve the dyeability of the stereoregular, high melting polyolefin. The level of addition of these primary modifiers should be between 2 and 20% of the weight of the overall composition including polyolefin. As shown and substantiated herein by the results which follow each of the examples, the utility of such primary modifiers may be vastly improved by replacing from 5 to 50%, preferability not more than 25%, of the primary modifier by a secondary modifier, heretofore listed, which has limited utility by itself.

The synergistic effects of the combinations, as taught, on the polyolefin includes vastly improved dyeability. However, the listed secondary modifiers also enhance the compatibility of the primary modifier in the polyolefin. These advantages are also accompanied by improvements in processing of the overall combination and, surprisingly, many infusable primary modifiers are rendered fusible and may be utilized within the concept of this invention to improve the dyeability of a polyolefin structure as heretofore taught.

The level of addition to the polyolefin of the synergistic combination heretofore described should be between 2 and 20% of the weight of the overall composition. If less than 2% is utilized, significant improvement will not be achieved in dyeability. If an amount greater than 20% is added to the polyolefin, many of the physical properties of the final product will be adversely affected. These include loss of strength and a lower resistance to repeated flexing.

As to the synergistic combination, it is desirable to use a minimum amount of secondary lower molecular weight additive to minimize any adverse affects on the properties of the fibers. An addition of the secondary additive above the limit stated (50%) may be in excess of that required to associate and complex with the primary modifier which makes up 50% to 95% of the synergistic combination. As a result, the excess secondary additive may sweat out of the polyolefin and interfere with processing.

I prefer however, to use not more than 25% of the secondary polar additive, since even between 25 and 50% there might be excessive reduction in the melting point of the combination and this would result in difficulties in processing, particularly drying.

It is also preferred not to go below 5% of the secondary polar additive because below this level very little improvement is achieved in dyeability.

Obviously, many modifications and variations of the present invention are possible in the light of the above teaching. It is therefore to be understood that within the scope of the appended claims, the invention may be practiced otherwise than as specifically described.

I claim:

1. Stereoregular polyolefin structures with increased affinity for dyes comprising
    a matrix of a stereoregular polyolefin selected from the group consisting of polypropylene, polymethylpentene, and polymethylbutene,
    said matrix having dispersed therein between 2 and 20% by weight of a synergistic combination consisting of
        (1) 50 to 95% by weight of a hydrophilic polymer, non-soluble in the polyolefin, taken from the group consisting of
            (a) polyethylene glycol resins
            (b) carboxymethylcellulose
            (c) sulphonated vinyl hydrocarbon polymers,
            (d) polyvinyl methyl oxazolidinone, and
            (e) polyvinyl pyrrolidone, and
        (2) 5 to 50% by weight of a lower molecular weight organic substance having at least one alkyl group with 6 to 30 carbons, said substance selected from the group consisting of
            (a) alkyl esters of polyhydroxy compounds,
            (d) alkyl ethers of polyhydroxy compounds,
            (e) alkoxylated alkyl amines,
            (f) di(2-ethylhexyl) phosphoric acid,
            (g) stearyl phosphoric acids,
            (h) salts of dodecylbenzene sulfonic acid,
            (i) salts of naphthalene sulfonic acids,
            (j) N-lauryl trimethylene diamine
            (k) salts of di(2-ethylhexyl) phosphoric acid,
said synergistic combination being fusible with said polyolefin at processing temperatures up to 350° C.

2. The combination of claim 1 wherein the lower molecular weight organic substances are alkyl esters of polyhydroxy compounds.

3. The combination of claim 1 wherein the lower molecular weight substances are alkyl phosphoric acids.

4. The combination of claim 1 wherein the lower molecular weight substances are alkoxylated alkyl amines.

5. A polymeric composition having improved affinity for dyes consisting essentially of a stereoregular polyolefin and 2 to 20% by weight of a synergistic combination consisting essentially of a predominant amount of a hydrophilic polymer which is not soluble in the polyolefin and a lesser amount of a lower molecular weight organic substance having at least one group with 6 to 30 carbon atoms, said hydrophilic polymer selected from the group consisting of
    (A) polyethylene glycol resins,
    (B) carboxymethylcellulose,
    (C) sulphonated vinyl hydrocarbon polymers,
    (D) poly-N-ethylenically substituted heterocycle and said lower molecular weight organic substance selected from the group consisting of
        (a) polyhydroxy substances having at least one reacted hydroxyl group,
        (b) amides,
        (c) amines,
        (d) esters of phosphoric acid,
        (e) salts of sulfonic acids,
        (f) salts of phosphoric and esters,
        (g) carboxylic acid, and
        (h) salts of carboxylic acids,
said synergistic combination being fusible with said polyolefin at processing temperatures up to about 350° C.

References Cited

UNITED STATES PATENTS 3,069,220   12/1962   Dawson               8—55
3,223,752   12/1965   Tate et al.         260—873

WILLIAM H. SHORT, *Primray Examiner.*

J. NORRIS, *Assitant Examiner.*